United States Patent
Hwang et al.

(10) Patent No.: US 8,027,401 B2
(45) Date of Patent: Sep. 27, 2011

(54) ITERATIVE DETECTION AND DECODING APPARATUS AND METHOD IN MIMO SYSTEM

(75) Inventors: Keun-Chul Hwang, Seongnam-si (KR); Sung-Woo Park, Suwon-si (KR); Soon-Young Yoon, Seoul (KR); Young-Hoon Kwon, Seongnam-si (KR); Sung-Soo Hwang, Suwon-si (KR); Soong-Yoon Choi, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 870 days.

(21) Appl. No.: 11/640,618

(22) Filed: Dec. 18, 2006

(65) Prior Publication Data

US 2007/0230609 A1 Oct. 4, 2007

(30) Foreign Application Priority Data

Dec. 16, 2005 (KR) .............................. 2005-0124276

(51) Int. Cl.
*H04L 1/02* (2006.01)

(52) U.S. Cl. ........................................ 375/267; 375/260

(58) Field of Classification Search .................. 375/267, 375/260; 455/132, 504, 59; 370/69.1
See application file for complete search history.

(56) References Cited

U.S. PATENT DOCUMENTS

| | | | | |
|---|---|---|---|---|
| 5,490,177 | A * | 2/1996 | La Rosa et al. | 375/329 |
| 6,381,726 | B1 * | 4/2002 | Weng | 714/780 |
| 7,212,579 | B2 * | 5/2007 | Claussen et al. | 375/267 |
| 7,383,487 | B2 * | 6/2008 | Shen et al. | 714/794 |
| 7,443,928 | B2 * | 10/2008 | Nefedov et al. | 375/323 |
| 2002/0186800 | A1 * | 12/2002 | Berthet et al. | 375/347 |
| 2003/0076890 | A1 * | 4/2003 | Hochwald et al. | 375/264 |
| 2004/0002309 | A1 * | 1/2004 | Ashikhmin et al. | 455/135 |
| 2005/0157811 | A1 | 7/2005 | Bjerke et al. | |
| 2005/0174983 | A1 | 8/2005 | Naguleswaran et al. | |

FOREIGN PATENT DOCUMENTS

| | | |
|---|---|---|
| GB | 2 396 278 | 6/2004 |
| KR | 1020020086166 | 11/2002 |
| KR | 1020050058269 | 6/2005 |
| KR | 1020050065873 | 6/2005 |

* cited by examiner

*Primary Examiner* — Shuwang Liu
*Assistant Examiner* — Helene Tayong
(74) *Attorney, Agent, or Firm* — The Farrell Law Firm, P.C.

(57) ABSTRACT

An iterative detection and decoding method in a Multiple Input Multiple Output (MIMO) system includes detecting entire MIMO nodes to generate soft decision values; decoding a first soft decision value among the soft decision values; determining whether to perform an iterative detection and decoding by measuring reliability of the decoded first decoding signal; generating a soft decision value by performing a redetection of a MIMO node containing the soft decision value, when the decoded soft decision value is iteratively detected and decoded; and decoding a second soft decision value among the soft decision values.

13 Claims, 9 Drawing Sheets

ITERATIVE DETECTION AND DECODING APPARATUS AND METHOD IN MIMO SYSTEM

PRIORITY

This application claims priority under 35 U.S.C. §119 to an application filed in the Korean Intellectual Property Office on Dec. 16, 2005 and allocated Serial No. 2005-124276, the contents of which are incorporated herein by reference.

BACKGROUND OF THE INVENTION

1. Field of the Invention

The present invention relates generally to a Multiple Input Multiple Output (MIMO) system, and in particular, to an apparatus and method for reducing a recalculation of a soft decision value in a MIMO system using an iterative detection and decoding scheme.

2. Description of the Related Art

With the rapid growth of mobile communication markets, various multimedia services for the wireless environment are in demand. In order to provide multimedia services in wireless communication systems, the development of technology to support a large capacity of transmit (TX) data and the high speed of data transfer are in progress. Therefore, the most urgent problem is to find methods that can efficiently use the limited frequencies in wireless communication systems. To solve the problem, wireless communication systems require new transfer techniques using multiple antennas. One of the new transfer techniques is a MIMO system using multiple antennas.

The MIMO system uses multiple antennas at a transmitter and a receiver. Compared with a system using a single antenna, the MIMO system can increase channel capacity in proportion to the number of antennas without additional frequency allocation or additional transmission power allocation.

MIMO technologies are classified into a spatial diversity scheme, a spatial multiplexing scheme, and a combination scheme of the spatial diversity and the spatial multiplexing. The spatial diversity scheme can obtain a diversity gain corresponding to a product of the number of TX antennas and the number of receive (RX) antennas, improving the transmission reliability. The spatial multiplexing scheme can increase the data rate by simultaneously transmitting a plurality of data streams.

When the spatial multiplexing scheme is used in the MIMO system, mutual interference occurs between the transmitted data streams. Therefore, the receiver detects signals using a maximum likelihood (ML) considering the influence of interference signals, or detects signals after interference cancellation. Examples of an interference cancellation scheme include a Zero Forcing (ZF) scheme and a Minimum Mean Square Error (MMSE) scheme.

However, the ML receiver has a drawback in that the complexity increases in proportion to the square of the number of TX antennas and the length of a codeword. Therefore, research on reception algorithms has been conducted which can reduce the calculation complexity of the receiver and obtain performance close to the ML receiver.

In addition, the MIMO system uses an iterative detection and decoding (IDD) scheme in which a turbo principle is applied to a MIMO receiver. In the MIMO IDD scheme, a single coder is concatenated with a channel coder and a MIMO coder. Thus, a MIMO detector of the MIMO receiver detects a signal received through an antenna and outputs the detection signal to a channel decoder. The channel decoder improves a bit performance by decoding the detection signal output from the MIMO detector and feeds back the decoded signal to the MIMO detector. The MIMO detector again generates a detection signal using the feedback signal. The MIMO receiver iteratively performs the above-described procedures. Examples of the MIMO IDD scheme include a list MIMO scheme and a turbo blast scheme. The two schemes have the same IDD scheme as the spatial multiplexing scheme of the transmitter, but are different in terms of the detection of the MIMO signal.

Figure 1:
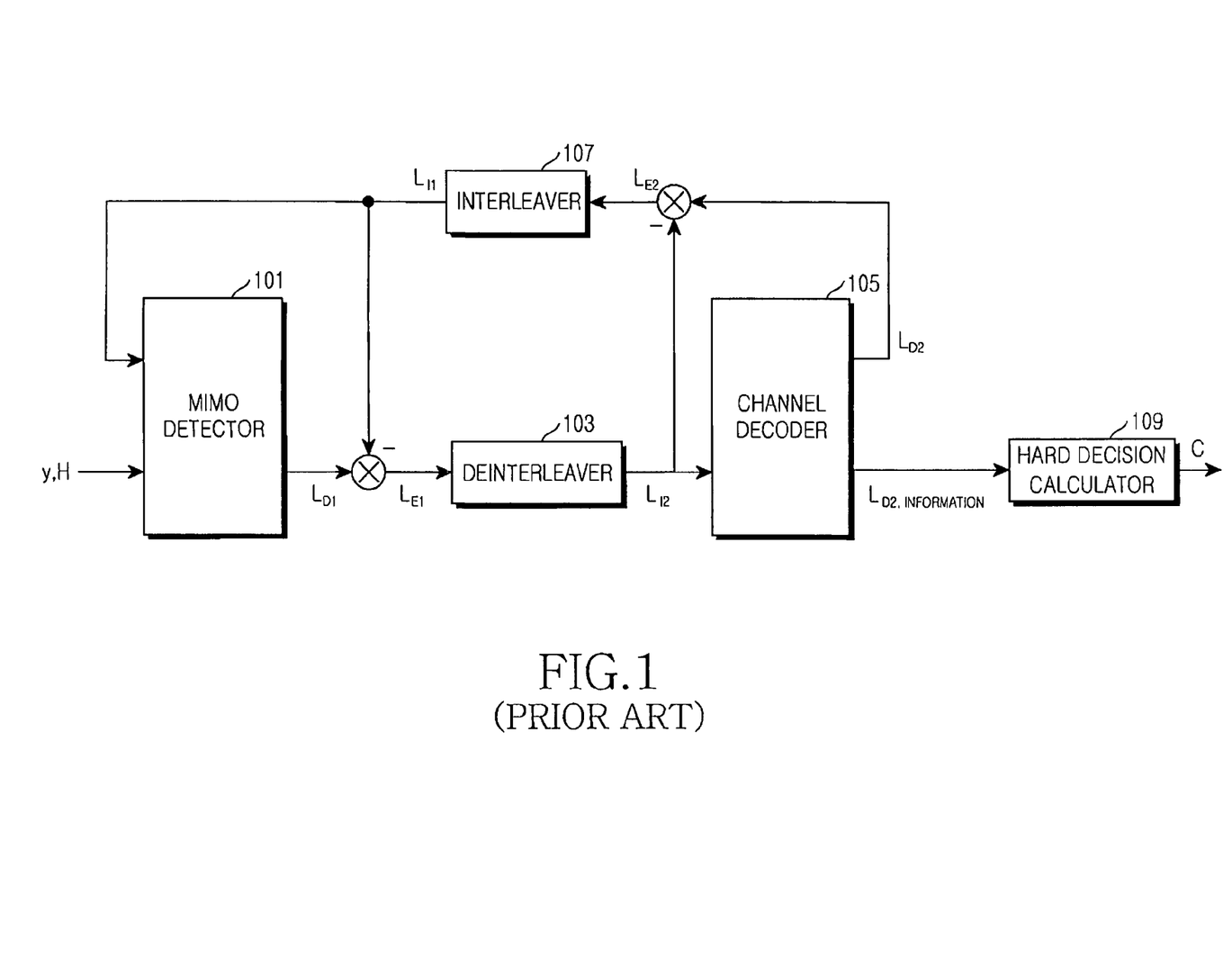
FIG. 1 is a block diagram of a conventional MIMO IDD receiver.

FIG. 1 is a block diagram of a conventional MIMO IDD receiver.

Referring to FIG. 1, when a signal is received, a MIMO detector 101 detects the received signal and generates a first soft decision data which is sent to a channel decoder 105 by deinterleaver 103. The soft decision information is a log likelihood ratio (LLR) value.

The channel decoder 105 decodes each bit using the first soft decision data as priori information and calculates a second soft decision value. That is, the channel decoder 105 corrects an error by decoding the first soft decision data. The second soft decision value calculated by the channel decoder 105 is fed back to the MIMO detector 101 by interleaver 107 and is used as the priori information for the IDD. By repeating the above-described procedures, the reliability of the received bits can be improved.

Figure 2:
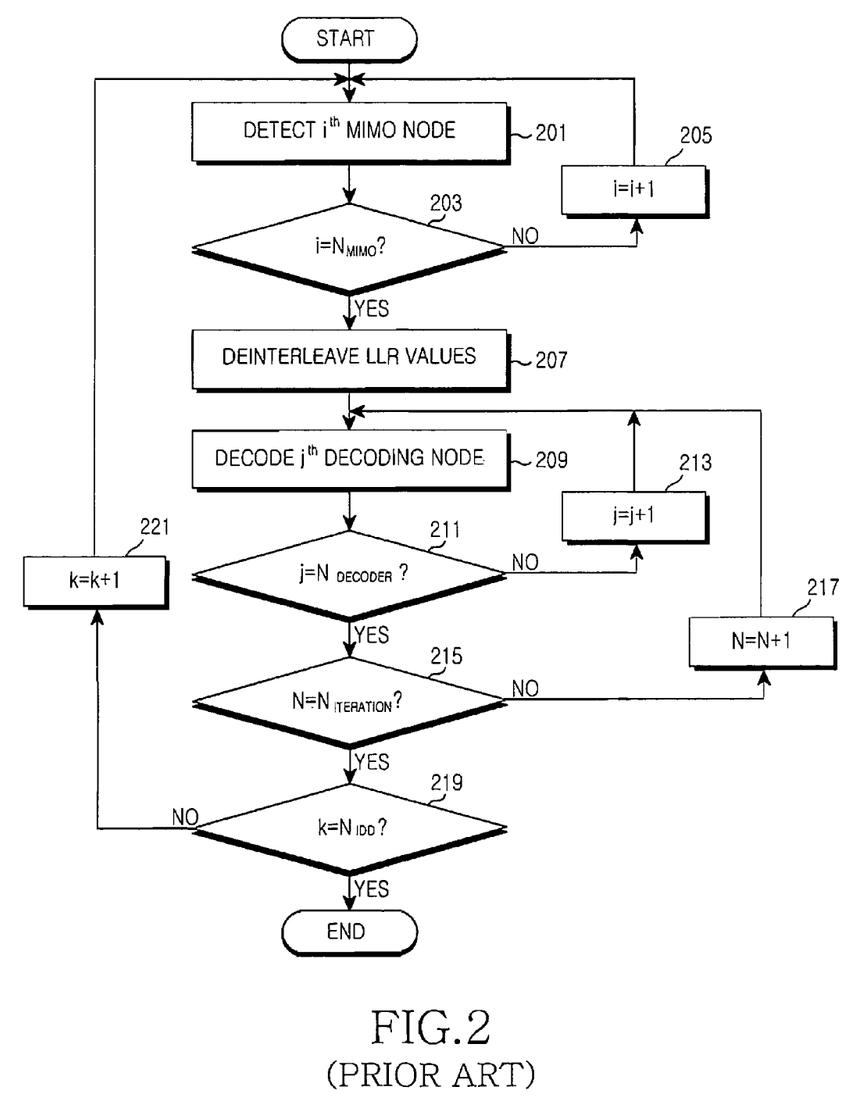
FIG. 2 is a flowchart illustrating an iteration process of the conventional MIMO IDD receiver.

FIG. 2 is a flowchart illustrating an iteration process of the conventional MIMO IDD receiver.

Referring to FIG. 2, the MIMO IDD receiver detects a received $i^{th}$ MIMO node in step 201. That is, the MIMO IDD receiver generates a log likelihood ratio (LLR) value, which is a soft decision value of the $i^{th}$ MIMO node. "i" denotes an index of the MIMO node and its initial value is "1".

In step 203, the MIMO IDD receiver determines if all the received MIMO nodes are detected. That is, the MIMO IDD receiver determines if the index i of the detected MIMO node is equal to a total number ($N_{MIMO}$) of the MIMO nodes.

When all the received MIMO nodes are not detected ($i \neq N_{MIMO}$), the MIMO IDD receiver increases i by 1 in step 205 and returns to step 201 to generate an LLR value of an $(i+1)^{th}$ MIMO node.

When all the received MIMO nodes are detected ($i = N_{MIMO}$), the MIMO IDD receiver proceeds to step 207 to deinterleave LLR values of the detected MIMO nodes. Thus, the MIMO nodes are rearranged.

In step 209, the MIMO IDD receiver decodes a $j^{th}$ decoding node among the deinterleaved LLR values. That is, the MIMO IDD receiver corrects an error by decoding the $j^{th}$ decoding node. "j" denotes an index of the decoding node and its initial value is "1". The decoding node indicates the LLR value.

In step 211, the MIMO IDD receiver determines if all the decoding nodes are decoded. That is, the MIMO IDD receiver determines if the index j of the decoded decoding node is equal to a total number ($N_{decoder}$) of the decoding nodes.

When all the decoding nodes are not decoded ($j \neq N_{decoder}$), the MIMO IDD receiver increases j by 1 in step 213 and returns to step 209 to generate an LLR value of an $(j+1)^{th}$ MIMO node.

When all the decoding nodes are decoded ($j = N_{decoder}$), the MIMO IDD receiver proceeds to step 215 to determine if the number (N) of decoding iterations up to this point is equal to a preset total number ($N_{iteration}$) of decoding iterations. That is, the MIMO IDD receiver determines if it has performed the total number of decoding iterations. "N" is an index representing the total number of the decoding iterations and its initial value is "1".

When the MIMO IDD receiver has not performed the total number of the decoding iterations (N≠N$_{iteration}$), it proceeds to step 217 to increase the number (N) of the decoding iterations by 1 and returns to step 209. At this point, the MIMO IDD receiver initializes the index (j) of the decoding node to "1".

When the MIMO IDD receiver has performed the total number of the decoding iterations (N=N$_{iteration}$), the MIMO IDD receiver determines if it has performed the IDD in step 219. That is, the MIMO IDD receiver determines if a current number (k) of IDDs is equal to a preset number (N$_{IDD}$) of IDDs.

When the MIMO IDD receiver has not performed the total number of IDD iterations (k≠N$_{IDD}$), it proceeds to step 221 to increase the current number of the IDD iterations by 1.

Then, the MIMO IDD receiver returns to step 201. At this point, the MIMO IDD receiver initializes the index (i) of the MIMO node, the index (j) of the decoding node, and the index (N) of the IDD iterations to "1".

When the MIMO IDD receiver has performed the total number of the IDD iterations, it terminates the algorithm.

Figure 3:
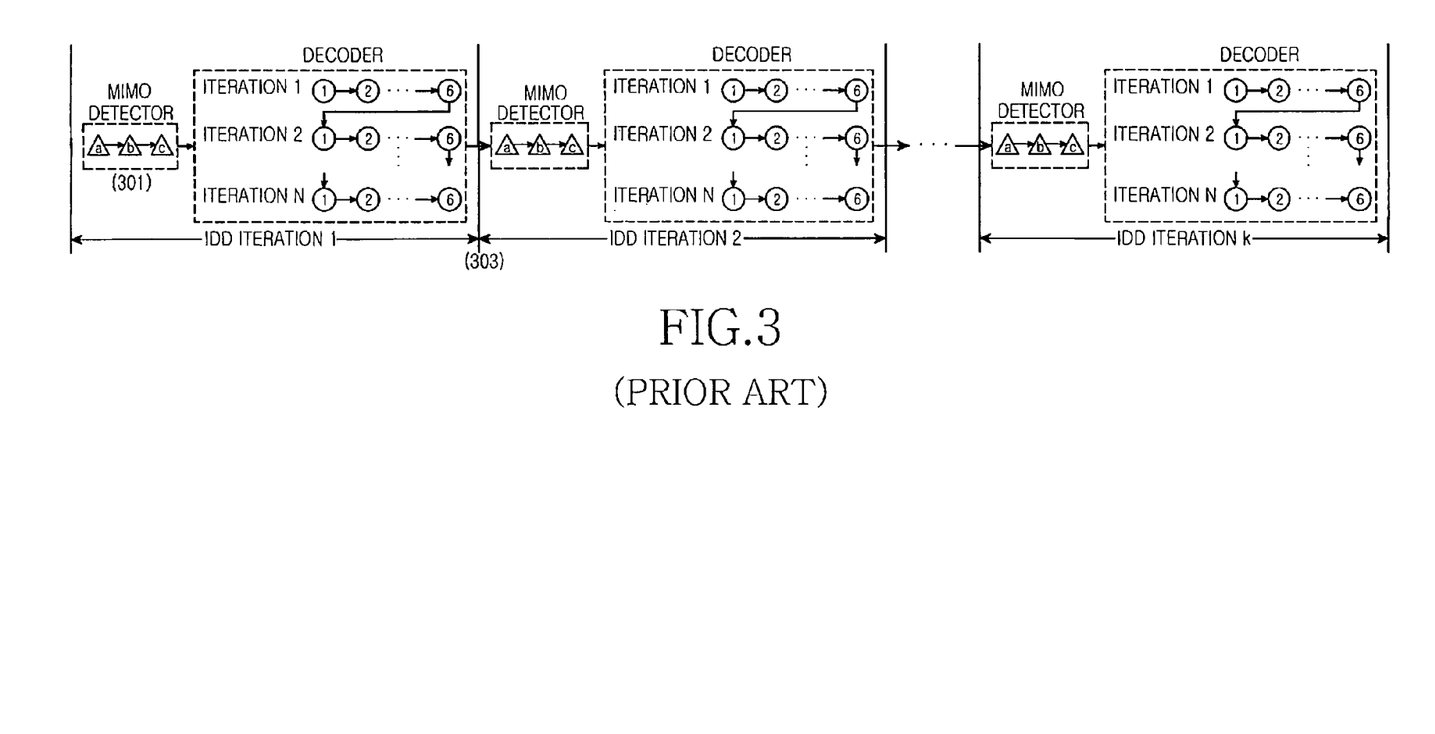
FIG. 3 is a conceptual diagram of the iteration process in the conventional MIMO IDD receiver.

FIG. 3 is a conceptual diagram of the iteration process in the conventional MIMO IDD receiver.

Referring to FIG. 3, the MIMO detector 101 of the MIMO IDD receiver generates the soft decision values of the received MIMO nodes and transmits the generated soft decision values to the channel decoder 105 in step 301. In step 303, the channel decoder 105 decodes the soft decision values N times based on the received soft decision values and feeds back the decoded soft decision values to the MIMO detector 101.

Then, the MIMO IDD receiver repeats the above-described procedure as many times as the designated number of the IDD iterations.

As described above, the MIMO IDD scheme recalculates the soft decision value by feeding back the soft decision values calculated from the separated detector and decoder, thereby improving the performance of the MIMO system. However, because the IDD scheme calculates as many LLR values as the size of the coding blocks of the detector and decoder in each iteration, the complexity of the system increases as a total number of iterations increases.

In addition, when the iteration is performed, the detection of the MIMO nodes is performed and the decoding nodes are decoded using the detected soft decision values. The decoded soft decision values are used to detect the MIMO nodes. Then, these procedures are iteratively performed. Therefore, the conventional MIMO IDD receiver has a problem in that the transmission continuity of the soft decision values is degraded and the MIMO IDD performance convergence speed is lowered.

SUMMARY OF THE INVENTION

An object of the present invention is to substantially solve at least the above problems and/or disadvantages and to provide at least the advantages below. Accordingly, an object of the present invention is to provide an apparatus and method for reducing the complexity of a receiver in a MIMO IDD system.

Another object of the present invention is to provide an apparatus and method for increasing a performance convergence speed of a MIMO IDD system.

A further object of the present invention is to provide an apparatus and method for reducing an amount of calculations by determining reliability in a decoded signal in a MIMO IDD system.

According to one aspect of the present invention, an iterative detection and decoding method in a MIMO system includes detecting entire MIMO nodes to generate soft decision values; decoding a first soft decision value among the soft decision values; determining whether to perform an iterative detection and decoding by measuring reliability of the decoded first decoding signal; generating a soft decision value by performing a redetection of a MIMO node containing the soft decision value, when the decoded soft decision value is iteratively detected and decoded; and decoding a second soft decision value among the soft decision values.

According to another aspect of the present invention, an iterative detection and decoding apparatus in a MIMO system includes a detector for detecting signals received through antennas to generate soft decision values; a decoder for decoding the soft decision values; and a reliability determiner for determining reliability of the decoded soft decision value and determining whether to perform an iterative detection and decoding process.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Hereinafter, an apparatus and method that can provide a reduced complexity and an improved performance convergence speed in a MIMO IDD system is disclosed.

Figure 4:
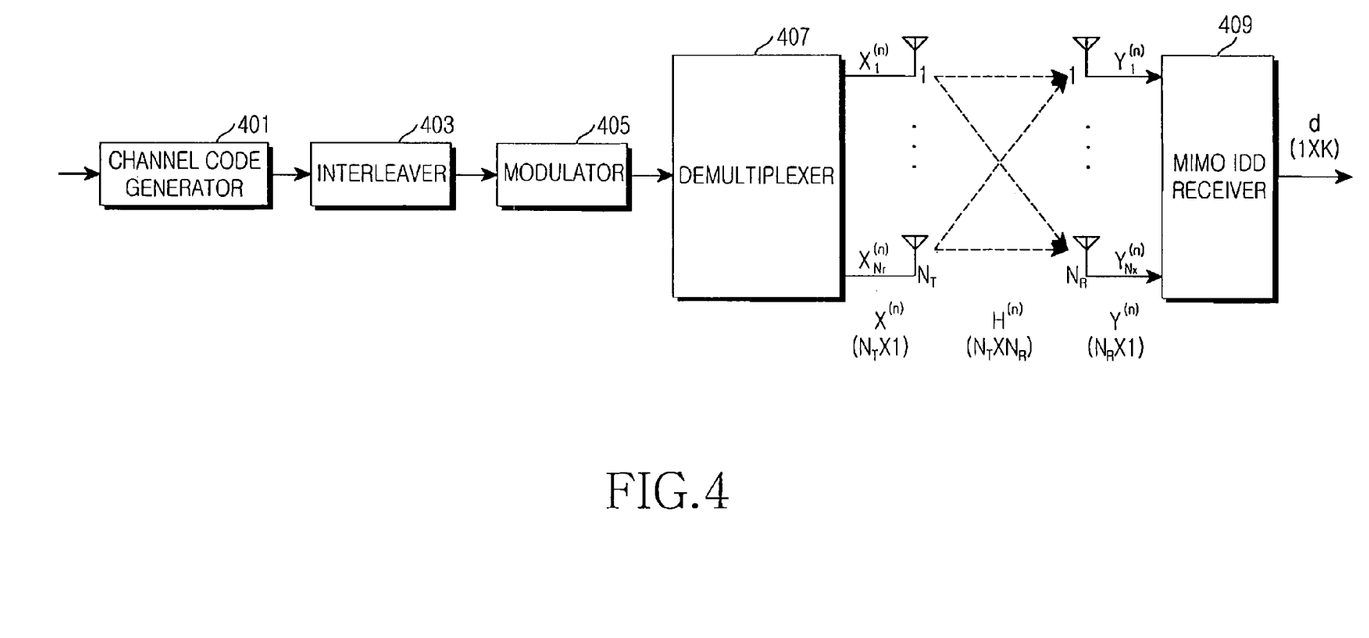
FIG. 4 is a block diagram of a MIMO system according to the present invention.

FIG. 4 is a block diagram of a MIMO system according to the present invention.

Referring to FIG. 4, a transmitter includes a channel code generator 401, an interleaver 403, a modulator 405, a demultiplexer 407, and a plurality of TX antennas. A receiver includes a plurality of RX antennas and a MIMO IDD receiver 409.

In the transmitter, the channel code generator 401 outputs code symbols by coding data bit streams at a given code rate. For example, the channel code generator 401 may be implemented with a convolutional encoder, a turbo encoder, a low density parity check (LDPC) encoder, and so on.

The interleaver 403 interleaves the code symbols in accordance with a predetermined rule such that they are robust against burst error.

The modulator 405 modulates the interleaved symbols in a predetermined modulation scheme. That is, a complex signal is output by mapping a signal point on a constellation diagram according to a predetermined mapping scheme. Examples of the modulation scheme include a Binary Phase Shift Keying (BPSK) scheme mapping one bit (s=1) on one complex signal, a Quadrature Phase Shift Keying (QPSK) scheme mapping two bits (s=2) on one complex signal, an 8ary Quadrature Amplitude Modulation (8QAM) scheme mapping three bits (s=3) on one complex signal, and a 16QAM scheme mapping four bits (s=4) on one complex signal.

The demultiplexer 407 demultiplexes complex signals output from the modulator 405 and transmits the demultiplexed complex signals through $N_T$ TX antennas. Although not shown, when the MIMO system uses an Orthogonal Frequency Division Multiplexing (OFDM) scheme, the transmitter OFDM-modulates a plurality of streams output from the demultiplexer 407. Then, the transmitter radio frequency (RF)-processes the OFDM modulated signals such that they can be transmitted over a real wireless resource (air), and transmits the RF signals through the corresponding antennas over air.

The receiver receives the signals transmitted from the transmitter through a plurality of RX antennas. Although not shown, when the MIMO system uses an OFDM scheme, the RF signals received through the RX antennas are converted into time-domain baseband sample data. The time-domain baseband sample data are OFDM-demodulated and are input to the MIMO IDD receiver 409.

The MIMO IDD receiver 409 determines the reliability of the signals received through the RX antennas and performs a partial IDD according to the determined reliability. In addition, the MIMO IDD receiver 409 calculates a hard decision value of a signal having a high reliability.

A detailed construction of the MIMO IDD receiver 409 will now be described. Priori information, posteriori information, and extrinsic information are comprised of soft decision values.

Figure 5:
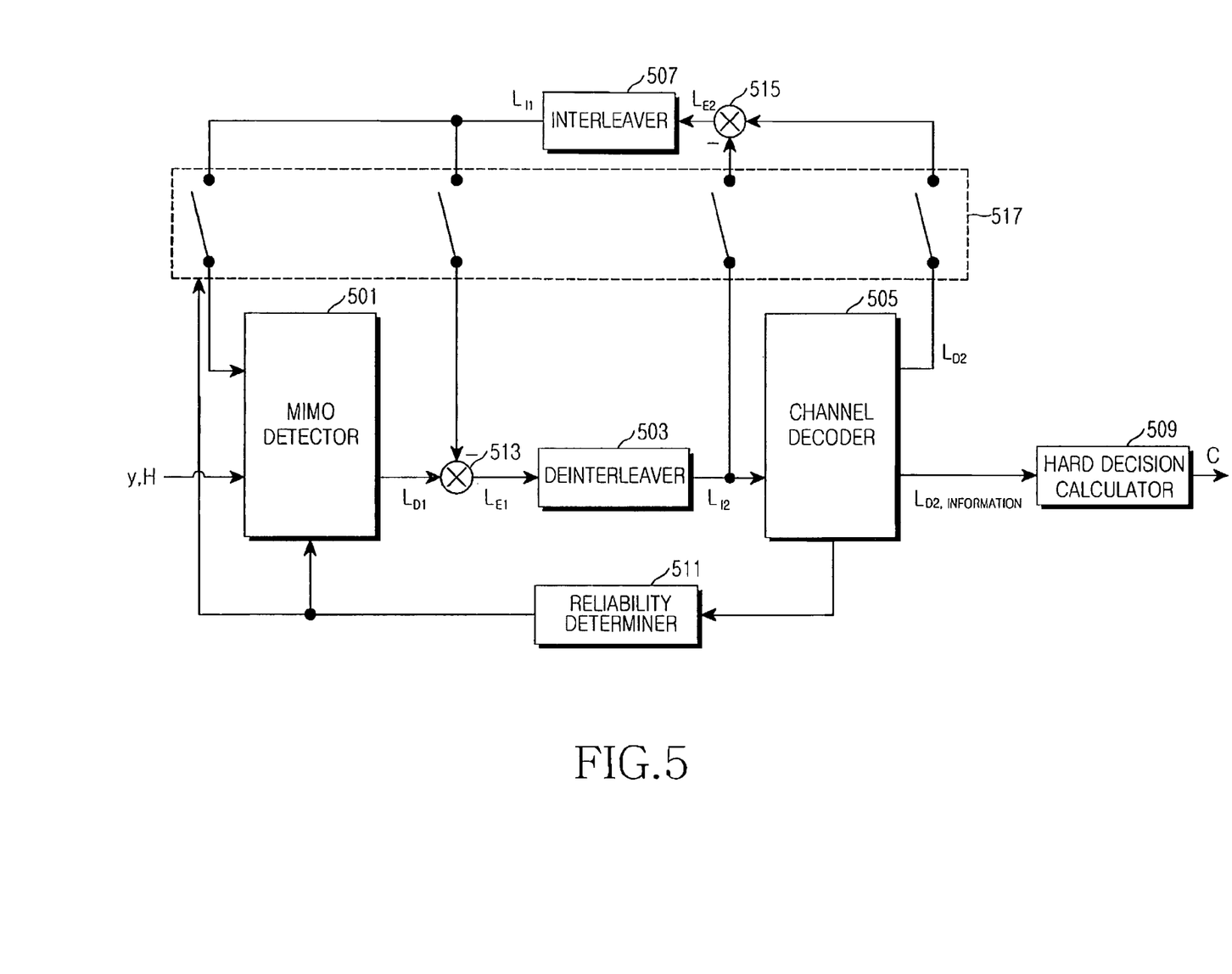
FIG. 5 is a block diagram of a MIMO IDD receiver according to the present invention.

FIG. 5 is a block diagram of a MIMO IDD receiver according to the present invention.

Referring to FIG. 5, the MIMO IDD receiver includes a MIMO detector 501, a deinterleaver 503, a channel decoder 505, an interleaver 507, a hard decision calculator 509, a reliability determiner 511, and subtractors 513 and 515.

The MIMO detector 501 calculates a first posteriori information $L_{D1}$ for each bit through the detection of the received signal using a first priori information $L_{I1}$. The first posteriori information $L_{D1}$ has an LLR value expressed as Equation (1). That is, the first posteriori information $L_{D1}$ has a soft decision value. Because the first priori information $L_{I1}$ does not exist in a first iteration, the probability of +1 and −1 is initialized to 1/2.

$$L_{D1}(c_k \mid y) = \ln \frac{P[c_k = +1 \mid y]}{P[c_k = -1 \mid y]} \qquad (1)$$

where y denotes the RX signal vector, $c_k$ denotes a $k^{th}$ bit of the RX signal, and $P(c_k=+1|y)$ denotes the probability that the $k^{th}$ bit is +1 when the RX signal vector is received.

When the MIMO detector 501 uses the list MIMO scheme, a sphere decoder is used. When the MIMO detector 501 uses the turbo blast scheme, an interference eliminator such as zero forcing and MMSE can be used.

The first subtractor 513 calculates a first extrinsic information $L_{E1}$ using a difference between the first posteriori information $L_{D1}$ of the MIMO detector 501 and the first priori information $L_{I1}$. The first posteriori information $L_{D1}$ of the MIMO detector 501 is comprised of a sum of the first priori information $L_{I1}$ and the first extrinsic information $L_{E1}$ as given by Equation (2). Therefore, the first extrinsic information $L_{E1}$ can be calculated using the difference between the first posteriori information $L_{D1}$ and the first priori information $L_{I1}$. When the first extrinsic information $L_{E1}$ is first calculated, it has the same value as the first posteriori information $L_{E1}$ because the first priori information $L_{I1}$ does not exist.

$$\begin{aligned} L_{D1}(c_k \mid y) &= \ln \frac{P[c_k = +1 \mid y]}{P[c_k = -1 \mid y]} \\ &= \ln \frac{P[c_k = +1]}{P[c_k = -1]} + \ln \frac{P[y \mid c_k = +1]}{P[y \mid c_k = -1]} \\ &= L_{I1}(c_k) + L_{E1}(c_k \mid y) \end{aligned} \qquad (2)$$

where $L_{I1}(c_k)$ denotes the first priori information, $L_{E1}(c_k)$ denotes the first extrinsic information, and $P(c_k=+1)$ denotes the probability that the $k^{th}$ bit is +1.

The deinterleaver 503 generates the second priori information $L_{I2}$ by deinterleaving the first extrinsic information $L_{E1}$ output from the first subtractor 513 according to the rule corresponding to the interleaver 403 of the transmitter illustrated in FIG. 4.

The channel decoder 505 calculates the second posteriori information $L_{D2}$ by decoding the second priori information $L_{I2}$ in accordance with a predefined decoding scheme [e.g., a BCJR (Bahl Cocke Jelinek Raviv) MAP decoding, a soft in/soft out Viterbi algorithm, etc.]. That is, the channel decoder 505 decodes the second priori information $L_{I2}$ to output the error-corrected second posteriori information $L_{D2}$. At this point, the channel decoder 505 feeds back only the second posteriori information $L_{D2}$ having a low reliability to the MIMO detector 501 under control of the reliability determiner 511.

The reliability determiner 511 determines the reliability of the second posteriori information $L_{D2}$ by comparing signs of the bits of the second posteriori information $L_{D2}$ and the second priori information $L_{I2}$ decoded by the channel decoder 505. For example, the reliability determiner 511 determines that the second posteriori information $L_{D2}$ has a low reliability when its bit has an opposite sign to that of the second priori information $L_{I2}$.

In order to increase the reliability of the bit having the low reliability, the reliability determiner 511 controls a switch 517 to feed back the detected $N_T M$ bits (hereinafter, referred to as a MIMO symbol) together with the corresponding bit. That is, the switch 517 connects the channel decoder 505 to the second subtractor 515 in order to feed back the MIMO symbol having low reliability under control of the reliability determiner 511. In addition, the switch 517 disconnects the second subtractor 515 from the channel decoder 505 in order not to feed back a MIMO symbol having a high reliability. The term "bit" means each of the LLR values. That is, the reliability determiner 511 determines whether to feed back the second posteriori information $L_{D2}$ by comparing the LLR values containing the second posteriori information $L_{D2}$ and the second priori information L.

The second subtractor 515 calculates the second extrinsic information $L_{E2}$ by removing the second priori information $L_{I2}$ from the second posteriori information $L_{D2}$ of the MIMO symbols to be fed back. That is, bit error of the LLR values contained in the second posteriori information $L_{D2}$ fed back from the channel decoder 505 is corrected during the decoding process. The channel decoder 505 corrects the error of the LLR values generated from the MIMO detector 501. Therefore, the second subtractor 515 removes the LLR values from the second posteriori information $L_{D2}$ in order not to feed back the error of the LLR values.

The interleaver 507 generates the first priori information $L_{I1}$ by interleaving the second extrinsic information $L_{E2}$ output from the second subtractor 515 in accordance with a predetermined rule.

The hard decision calculator 509 calculates hard decision values of the bits to which data exchange or LLR recalculation in the signals decoded by the channel decoder 505 is not performed in the reliability determiner 511. That is, the hard decision calculator 509 determines the hard decision values with respect to the MIMO symbols determined by the reliability determiner 511 as being reliable.

As described above, the reliability determiner 511 determines to perform the feedback process only on the MIMO symbol containing the bit of the second posteriori information $L_{D2}$, the sign of which is opposite to that of the second priori information $L_{I2}$. In addition, the reliability determiner 511 can also determine the feedback process according to variations of the extrinsic information. That is, the reliability determiner 511 measures the LLR variation of the second posteriori information $L_{D2}$ and the second priori information $L_{I2}$ and determines the feedback of the MIMO symbols containing the corresponding LLR value when the LLR variation is greater than a preset reference value.

In addition, when a parity bit such as an LDPC code or turbo code is contained, the reliability determiner 511 determines the feedback of MIMO symbols containing bits that do not satisfy a parity equation. The term "bit" means the LLR value.

Figure 6:
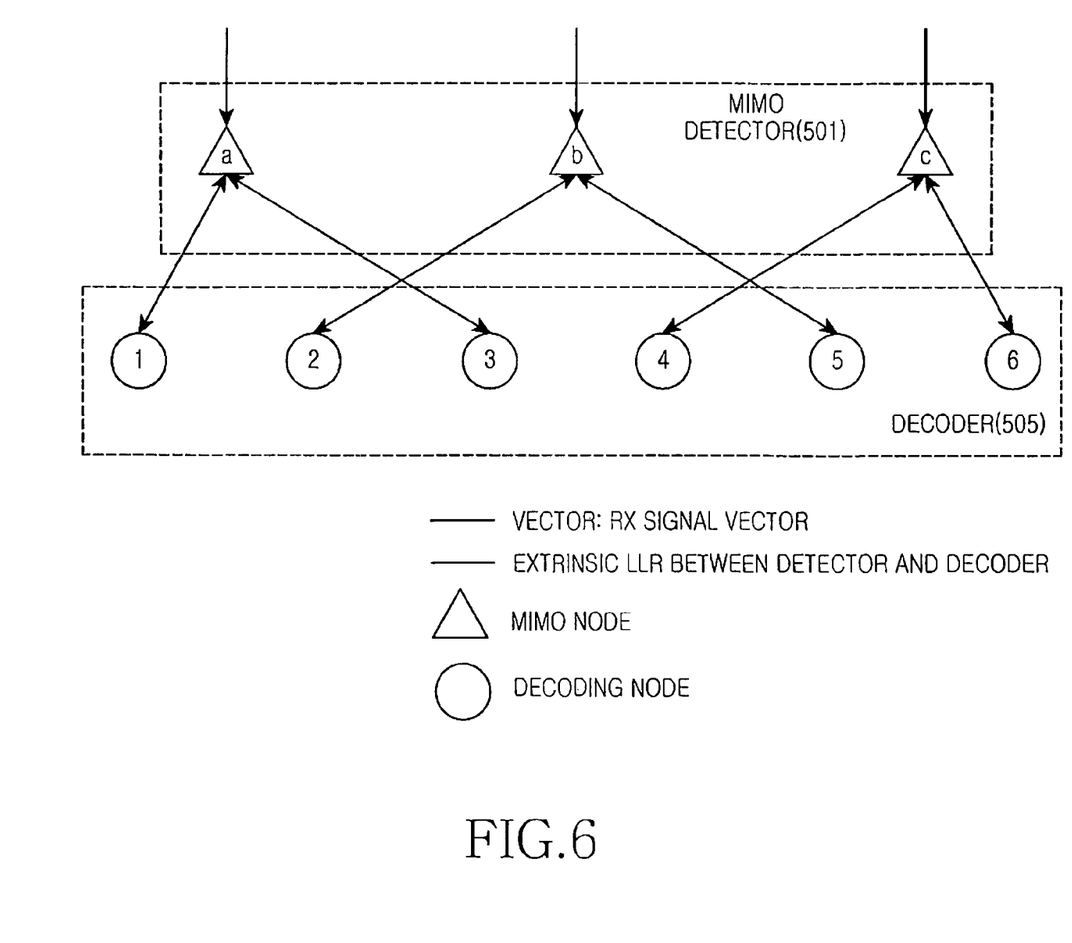
FIG. 6 is a conceptual diagram of an LLR update of a MIMO IDD receiver.

As described above, an IDD process is performed between the MIMO detector 501 and channel decoder 505, as illustrated in FIG. 6.

FIG. 6 is a conceptual diagram of an LLR update of a MIMO IDD receiver.

Referring to FIG. 6, the MIMO detector 501 generates a soft decision value (i.e., an LLR value) through the MIMO detection in the signal received through the antenna. The MIMO detector 501 generates the soft decision value in each MIMO node.

The channel decoder 505 corrects an error by decoding the soft decision value in each decoding node. After decoding a $j^{th}$ decoding node, the channel decoder 505 feeds back the MIMO node containing the $j^{th}$ decoding node to the MIMO detector 501 when the reliability of the decoded $j^{th}$ decoding node is determined as being low.

The MIMO decoder 501 to which the MIMO node is fed back from the channel decoder 505 again detects the MIMO node.

The MIMO IDD receiver iteratively performs the IDD process.

Figure 7:
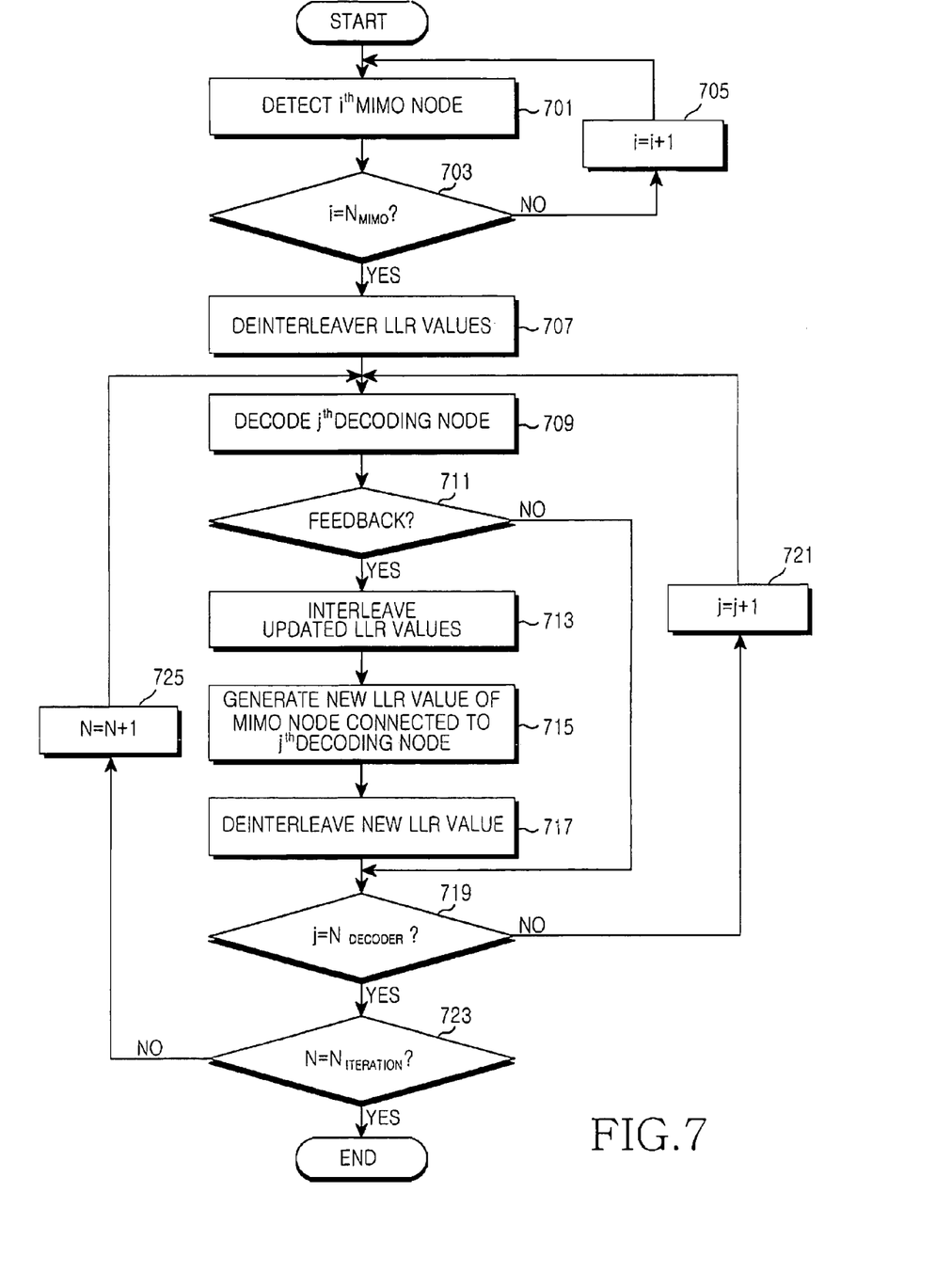
FIG. 7 is a flowchart illustrating an iteration process of a MIMO IDD receiver according to the present invention.

FIG. 7 is a flowchart illustrating an iteration process of a MIMO IDD receiver according to the present invention.

Referring to FIG. 7, the MIMO IDD receiver detects an $i^{th}$ MIMO node in step 701. That is, the MIMO IDD receiver generates an LLR value that is a soft decision value of the $i^{th}$ MIMO node. "i" denotes an index of the MIMO node and its initial value is "1".

In step 703, the MIMO IDD receiver compares the index (i) of the MIMO node with a total number ($N_{MIMO}$) of the MIMO nodes in order to determine if all the MIMO nodes are detected.

When all the MIMO nodes are not detected ($i \neq N_{MIMO}$), the MIMO IDD receiver increases the index (i) by 1 in step 705 and returns to step 701 to detect an $(i+1)^{th}$ MIMO node. That is, the MIMO IDD receiver generates an LLR value of the $(i+1)^{th}$ MIMO node.

When all the received MIMO nodes are detected ($i = N_{MIMO}$), the MIMO IDD receiver proceeds to step 707 to deinterleave LLR values of the detected MIMO nodes.

In step 709, the channel decoder 505 decodes the deinterleaved LLR values. That is, the MIMO IDD receiver updates the LLR value by correcting an error of the $j^{th}$ decoding node contained in the channel decoder 505. "j" denotes an index of the decoding node and its initial value is "1". The decoding node indicates one of the LLR values.

In step 711, after decoding the $j^{th}$ decoding node, the MIMO IDD receiver determines the reliability of the $j^{th}$ decoding node and determines whether to perform feedback of the MIMO node containing the $j^{th}$ decoding node. For example, the MIMO IDD receiver determines the reliability of the $j^{th}$ decoding node using the LLR sign and LLR variation of the input/output signal of the channel decoder 505, or a parity equation. When the LLR sign is used, the MIMO MD receiver compares the sign of the $j^{th}$ decoding node among the LLR values, which are generated from the MIMO detector 501, with the sign of the decoded $j^{th}$ decoding node. At this point, the MIMO IDD receiver determines the feedback of the MIMO node containing the $j^{th}$ decoding node when the signs before and after the decoding of the $j^{th}$ decoding node are different from each other.

When the LLR variation is used, the MIMO IDD receiver checks the LLR variation between the $j^{th}$ decoding node and the decoded $j^{th}$ decoding node. When the LLR variation is greater than a predetermined reference value, the MIMO IDD receiver determines the feedback of the MIMO node containing the $j^{th}$ decoding node.

When the parity bit such as a low density parity check (LDPC) code or turbo code is contained, the MIMO IDD receiver determines the feedback of the MIMO node containing the $j^{th}$ decoding node when the $j^{th}$ decoding node does not satisfy the parity equation.

In step 711, when the feedback of the MIMO node containing the $j^{th}$ decoding node is not performed, the MIMO IDD receiver proceeds to step 719 to determine if the index (j) of the decoded decoding node is equal to the total number ($N_{decoder}$) of the decoding nodes in order to check whether all the decoding nodes have been decoded.

In step 711, when the feedback of the MIMO node containing the $j^{th}$ decoding node is performed, the MIMO IDD receiver proceeds to step 713 to interleave the LLR value updated in the $j^{th}$ decoding node.

In step 715, the MIMO IDD receiver again generates the LLR value by performing the detection of the MIMO node connected to the $j^{th}$ decoding node. In step 717, the MIMO IDD receiver deinterleaves the generated LLR value.

After deinterleaving the LLR value, the MIMO IDD receiver proceeds to step 719 to determine if the index (j) of the decoded decoding node is equal to the total number ($N_{decoder}$) of the decoding nodes in order to check whether all the decoding nodes have been decoded.

When all the decoding nodes have not been decoded ($j \neq N_{decoder}$), the MIMO IDD receiver increases the index (j) by 1 in step 721 and returns to step 709 to decode the $j^{th}$ decoding node. That is, the MIMO IDD receiver updates the LLR value at the $j^{th}$ decoding node. At this point, the $j^{th}$ decoding node can be decoded using the LLR value regenerated through the detection of the MIMO node containing the previous decoding node, or can be decoded without using the LLR value.

In step 719, when all the decoding nodes are decoded ($j = N_{decoder}$), the MIMO IDD receiver proceeds to step 723 to determine if number (N) of decoding iterations up to this point is equal to a preset total number ($N_{iteration}$) of decoding iterations. That is, the MIMO IDD receiver determines if it has performed the total number of the decoding iterations. "N" is an index representing the total number of the decoding iterations and its initial value is "1".

When the MIMO IDD receiver has not performed the total number of the decoding iterations ($N \neq N_{iteration}$), it proceeds to step 725 to increase the number (N) of the decoding iterations by 1 and returns to step 709. At this point, the MIMO IDD receiver initializes the index (j) of the decoding node to "1".

When the MIMO IDD receiver has performed the total number of the decoding iterations ($N = N_{iteration}$)) it terminates the algorithm.

Figure 8:
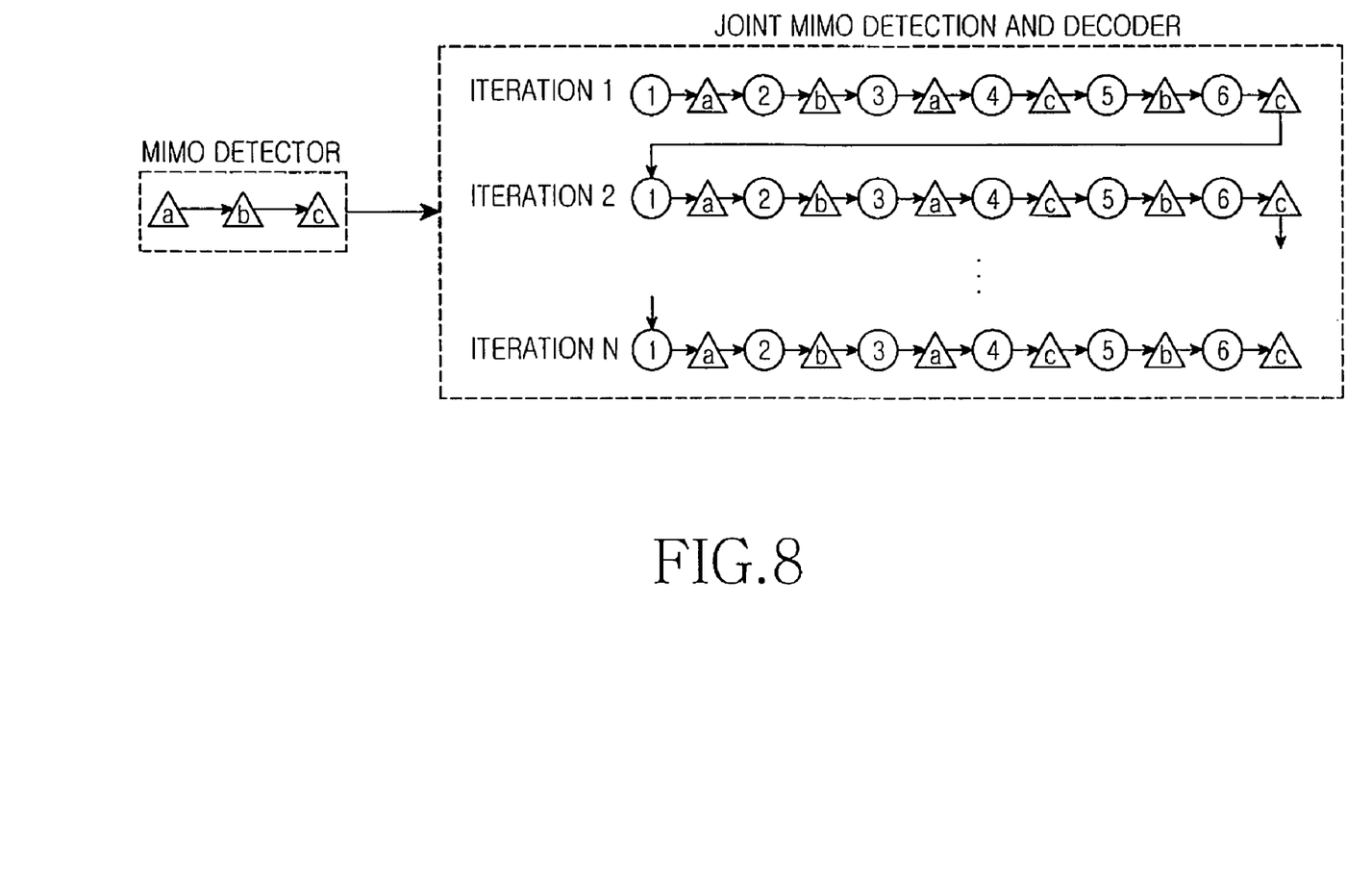
FIG. 8 is a conceptual diagram of an iteration process in a MIMO IDD receiver according to the present invention.

As described above, the MIMO IDD receiver performs the IDD process between the MIMO detector 501 and the channel decoder 505 as illustrated in FIG. 8.

FIG. 8 is a conceptual diagram of the iteration process in a MIMO IDD receiver according to the present invention.

Referring to FIG. 8, the MIMO detector of the MIMO IDD receiver detects the MIMO nodes to generate the LLR values to the channel decoder.

The channel decoder decodes the first decoding node among the LLR values received from the MIMO detector. Then, the channel decoder detects an $a^{th}$ MIMO node by feeding back the $a^{th}$ MEMO node containing the first decoding node to the MIMO detector.

The channel decoder decodes the second decoding node. That is, the MIMO IDD receiver iteratively performs the above-described procedure as many times as a preset number of times. The channel decoder can be decoded in sequence, or can be decoded according to a preset pattern. Also, the channel decoder can randomly perform the decoding process.

In this case, the convergence speed of the MIMO IDD receiver is increased, but an amount of calculation of the MIMO nodes is also increased. Therefore, the MIMO IDD receiver determines the reliability of the decoded decoding node and selectively feeds back the MIMO node. That is, after channel decoder decodes the first decoding node, the reliability determiner of the MIMO IDD receiver determines the reliability of the decoded first decoding node. When it is determined that the decoded first decoding node has a low reliability, the channel decoder feeds back the $a^{th}$ MIMO node containing the first decoding node to the MIMO detector.

Then, the channel decoder decodes the second decoding node. That is, the MIMO IDD receiver iteratively performs the above-described procedures as many times as a preset number of times.

Meanwhile, when it is determined that the decoded first decoding node has a high reliability, the channel decoder decodes the second decoding node. That is, the MIMO IDD receiver iteratively performs the above-described procedures a preset number of times.

Because the MIMO IDD receiver selectively performs the feedback of the MIMO node according to the reliability of the decoding node, an increase in the amount of the calculation of the MIMO nodes can be prevented.

Figure 9:
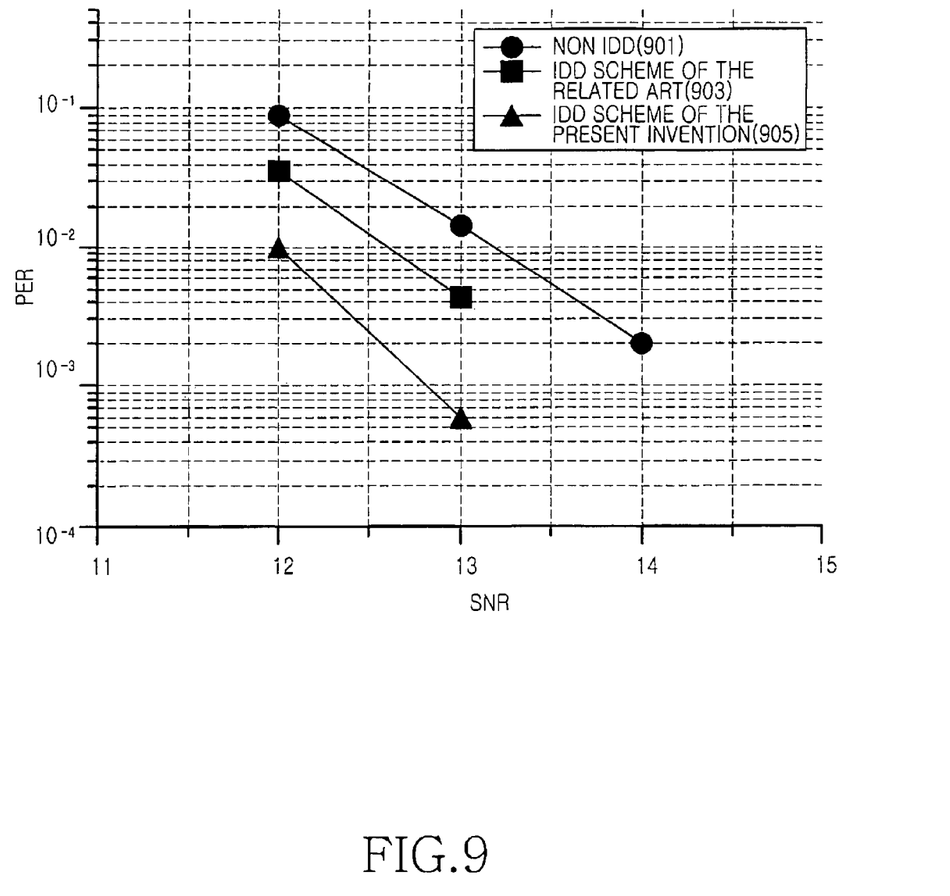
FIG. 9 is a graph illustrating a performance improvement of a MIMO IDD receiver according to the present invention.

FIG. 9 is a graph illustrating the performance improvement of the MIMO IDD receiver according to the present invention. A 4×4 MIMO OFDM system was used, a fast Fourier transformation (FFT) size was 4096, a modulation scheme was a 16QAM, and a sorted MML (Modified ML) was used as a detection scheme. In addition, a channel code was a 5/6 rate LDPC code, and a 9-tap exponential decay channel using a packet size of 12,608 bits/packet was used. The number of the decoding iterations was 24 and the number of the IDD iterations was 1.

In FIG. 9, a horizontal axis represents a signal to noise ratio (SNR) and a vertical axis represents a packet error ratio (PER).

Referring to FIG. 9, the conventional IDD scheme 903 obtained a gain of 0.6 dB at a PER of 0.01 ($=10^{-2}$) compared with the non IDD scheme 901, but the IDD scheme 905 of the present invention can obtain 0.4 dB at the PER of 0.01 ($=10^{-2}$) compared with the conventional IDD scheme 903.

As described above, an amount of recalculation can be reduced according to the reliability of the LLR values occurring in the spatial multiplexing MIMO IDD receiver during the iteration process, and the convergence speed can be increased by changing the processing order between the detector and the decoder. In addition, because the amount of the recalculation is reduced, the complexity can be reduced and the number of hardware logics can be reduced. Moreover, the complexity is reduced. Therefore, the reliability can be improved by increasing the number of iterations.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An iterative detection and decoding method in a Multiple Input Multiple Output (MIMO) system, comprising the steps of:
   generating soft decision values by performing a detection of an entire set of MIMO nodes;
   decoding a first decoding station using the generated soft decision values to produce a first decoding value;
   re-generating soft decision values by performing a redetection of a first MIMO node, from the set of MIMO nodes, that corresponds to the first decoding station, when a variation between the first decoding value and a corresponding one of the generated soft decision values is greater than a reference value;
   decoding a second decoding station using at least one of the generated soft decision values and the re-generated soft decision values to produce a second decoding value; and
   re-generating soft decision values by performing a redetection of a second MIMO node, from the set of MIMO nodes, that corresponds to the second decoding station, when a variation between the second decoding value and a corresponding one of the generated soft decision values is greater than the reference value;
   wherein the decoding step and the re-generating step are performed a number of times equal to a total number of decoding stations and the number of decoding and regenerating steps are iterated at least one time.

2. The iterative detection and decoding method of claim 1, further comprising deinterleaving the generated soft decision values.

3. The iterative detection and decoding method of claim 1, wherein redetecting a MIMO node comprises:
   interleaving the MIMO node that corresponds to a decoding value; and
   redetecting the MIMO node that corresponds to the decoding value as interleaved.

4. The iterative detection and decoding method of claim 1, wherein each soft decision value is a log likelihood ratio.

5. The iterative detection and decoding method of claim 1, further comprising decoding the second decoding station using the generated soft decision values when the variation is not greater than the reference value.

6. An iterative detection and decoding method in a Multiple Input Multiple Output (MIMO) system, comprising the steps of:
   generating soft decision values by performing a detection of an entire set of MIMO nodes;
   decoding a first decoding station using the generated soft decision values to produce a first decoding value;
   re-generating soft decision values by performing a redetection of a first MIMO node, from the set of MIMO nodes, that corresponds to the first decoding station, when it is determined that there is a soft decision value that does not satisfy a parity equation by using a parity bit contained in a received signal;
   decoding a second decoding station using at least one of the generated soft decision values and the re-generated soft decision values to produce a second decoding value; and
   re-generating soft decision values by performing a redetection of a second MIMO node, from the set of MIMO nodes, that corresponds to the second decoding station when it is determined that there is a soft decision value that does not satisfy a parity equation by using a parity bit contained in the received signal;
   wherein the decoding step and the re-generating step are performed a number of times equal to a total number of decoding stations and the number of decoding and regenerating steps are iterated at least one time.

7. An iterative detection and decoding apparatus in a Multiple Input Multiple Output (MIMO) system, comprising:
   a detector for generating soft decision values by detecting an entire set of MIMO nodes of signals received through antennas;
   a decoder for decoding a decoding station using the generated soft decision values to produce a decoding value and providing the detector with the decoded decoding value; and
   a reliability determiner for determining reliability of the decoded decoding value by checking a variation between the decoding value and a corresponding one of the generated soft decision values;
   wherein the detector re-generates soft decision values by redetecting a MIMO node, from the entire set of MIMO nodes, that corresponds to the decoding station when the variation is greater than a reference value;
   wherein, when there is a next decoding station, the decoder decodes the next decoding station using at least one of the re-generated soft decision values and the generated soft decision values to produce a next decoding value;
   wherein the decoding step and the re-generating step are performed a number of times equal to a total number of decoding stations and the number of decoding and regenerating steps are iterated at least one time.

8. The iterative detection and decoding apparatus of claim 7, wherein the detector uses one of a sphere decoding scheme, a Zero Forcing (ZF) scheme, and a Minimum Mean Square Error (MMSE) scheme.

9. The iterative detection and decoding apparatus of claim 7, wherein when the variation is not greater than the reference value, the decoder decodes the next decoding station using the generated soft decision values.

10. The iterative detection and decoding apparatus of claim 7, further comprising a switch for transferring a signal to be iteratively detected and decoded to the detector under control of the reliability determiner.

11. The iterative detection and decoding apparatus of claim 7, further comprising:
    a deinterleaver for deinterleaving the soft decision values generated from the detector and outputting the deinterleaved soft decision values to the decoder; and
    an interleaver for interleaving a signal to be iteratively detected and decoded in the decoder and outputting the interleaved signal to the detector.

12. The iterative detection and decoding apparatus of claim 7, wherein when the reliability determiner determines that the variation is not greater than the reference value, the decoder transmits the MIMO node corresponding to the decoding value to the detector.

13. An iterative detection and decoding apparatus in a Multiple Input Multiple Output (MIMO) system, comprising:
    a detector for generating soft decision values by detecting an entire set of MIMO nodes of signals received through antennas;
    a decoder for decoding a decoding station using the generated soft decision values to produce a decoding value and providing the detector with the decoded decoding value; and
    a reliability determiner for determining reliability of the decoded decoding value by determining if there is a soft decision value that does not satisfy a parity equation by using a parity bit contained in the received signal;
    wherein the detector re-generates soft decision values by redetecting a MIMO node, from the entire set of MIMO nodes, that corresponds to the decoding station when there is the soft decision value that does not satisfy the parity equation;
    wherein, when there is a next decoding station, the decoder decodes the next decoding station using at least one of the re-generated soft decision values and the generated soft decision values to produce a next decoding value;
    wherein the decoding step and the re-generating step are performed a number of times equal to a total number of decoding stations and the number of decoding and regenerating steps are iterated at least one time.

* * * * *